United States Patent
Apollonio et al.

(10) Patent No.: US 10,427,453 B2
(45) Date of Patent: Oct. 1, 2019

(54) WHEEL FOR ENERGY RECOVERY, IN PARTICULAR IN VEHICLES WITH ELECTRIC OR HYBRID PROPULSION

(71) Applicant: SER.CA. S.R.L., Orzinuovi (BS) (IT)

(72) Inventors: Giuseppe Apollonio, Orzinuovi (IT); Marco Apollonio, Orzinuovi (IT); Roberto Apollonio, Orzinuovi (IT)

(73) Assignee: SER.CA. S.r.l., Orzinuovi (IT)

( * ) Notice: Subject to any disclaimer, the term of this patent is extended or adjusted under 35 U.S.C. 154(b) by 0 days.

(21) Appl. No.: 15/744,204

(22) PCT Filed: Jul. 28, 2016

(86) PCT No.: PCT/EP2016/068081
§ 371 (c)(1),
(2) Date: Jan. 12, 2018

(87) PCT Pub. No.: WO2017/017223
PCT Pub. Date: Feb. 2, 2017

(65) Prior Publication Data
US 2018/0201058 A1    Jul. 19, 2018

(30) Foreign Application Priority Data

Jul. 30, 2015  (IT) ........................ 102015000040257

(51) Int. Cl.
*B60B 9/24*        (2006.01)
*B60K 25/08*       (2006.01)
(Continued)

(52) U.S. Cl.
CPC ................. *B60B 9/24* (2013.01); *B60B 9/28* (2013.01); *B60B 19/08* (2013.01); *B60B 25/004* (2013.01);
(Continued)

(58) Field of Classification Search
CPC ........... B60B 9/24; B60B 9/28; B60B 25/004; B60K 25/08; B60C 7/12; F03G 7/08
See application file for complete search history.

(56) References Cited

U.S. PATENT DOCUMENTS 1,574,095 A * 2/1926 Jokisch .................... B62M 1/10
                                                              180/54.1
2,423,690 A * 7/1947 Dickerson ................. B60B 9/28
                                                               152/15
(Continued)

FOREIGN PATENT DOCUMENTS

CN    102 320 242 A    1/2012
CN    202 357 872 U    8/2012
(Continued)

OTHER PUBLICATIONS

International Search Report, dated Oct. 20, 2016, from corresponding PCT/EP2016/068081 application.

*Primary Examiner* — Frank B Vanaman
(74) *Attorney, Agent, or Firm* — Young & Thompson (57) ABSTRACT

A wheel for vehicles, in particular with electric or hybrid propulsor, is provided that is apt to recover at least a part of the energy which is required in order to deform the tire of the wheel during its rotation and to transfer the energy, recovered in this manner, from the wheel to the vehicle on which the wheel is mounted, so that this energy, recovered, is used to generate the electrical energy intended to feed the devices installed on the vehicle, such as in particular the respective electric propulsor.

20 Claims, 10 Drawing Sheets

(51) Int. Cl.
*B60B 9/28* (2006.01)
*B60B 19/08* (2006.01)
*B60B 25/00* (2006.01)
*B60C 7/12* (2006.01)
*F03G 7/08* (2006.01)

(52) U.S. Cl.
CPC ............... *B60C 7/12* (2013.01); *B60K 25/08* (2013.01); *F03G 7/08* (2013.01)

(56) References Cited

U.S. PATENT DOCUMENTS

| | | | | | |
|---|---|---|---|---|---|
| 3,154,127 | A | * | 10/1964 | Felton | B60B 9/28 152/102 |
| 3,253,632 | A | * | 5/1966 | Dalrymple | B60B 9/28 152/15 |
| 3,699,367 | A | * | 10/1972 | Thomas | B60C 23/08 310/69 |
| 5,323,688 | A | * | 6/1994 | Walker | B60K 6/12 180/242 |
| 6,291,901 | B1 | * | 9/2001 | Cefo | B60L 8/00 290/1 R |
| 2007/0057480 | A1 | * | 3/2007 | Tada | B60B 9/24 280/124.1 |
| 2010/0319345 | A1 | * | 12/2010 | Sinan | B60K 6/365 60/613 |
| 2016/0159213 | A1 | * | 6/2016 | Holmes | B60B 9/28 180/8.3 |
| 2017/0338719 | A1 | * | 11/2017 | Park | B60L 11/18 |

FOREIGN PATENT DOCUMENTS

| | | |
|---|---|---|
| CN | 203 844 533 U | 9/2014 |
| FR | 1 532 724 A | 7/1968 |
| WO | 2008/079174 A2 | 7/2008 |

\* cited by examiner

WHEEL FOR ENERGY RECOVERY, IN PARTICULAR IN VEHICLES WITH ELECTRIC OR HYBRID PROPULSION

FIELD OF THE INVENTION

The invention relates in general to an improved wheel for energy recovery, particularly suitable for being used to recover energy in vehicles with electric propulsion.

The object of the invention is also a corresponding vehicle, in particular with electric propulsion, having the capacity to recover the energy relating to the use and the operation of the vehicle, so as to generate electrical energy intended to feed devices, and typically the electric propulsor, installed on board the same vehicle.

TECHNICAL BACKGROUND OF THE INVENTION

As is known, in many types of vehicles, in particular with electric propulsion or with hybrid propulsion, devices are currently installed suitable for recovering at least a part of the energy which is generated by the propulsor in order to make the vehicle operate and which, if not recovered, would inevitably be dispersed.

For example vehicles with electric propulsion are known, provided with devices which recover the energy which is produced during braking and transform it into electrical energy which is used to recharge the batteries which feed the electric propulsor of the vehicle.

Among the solutions known in this field, mention is made in particular of the apparatus, such as that described by the Chinese utility model CN 202 357 872 U, having the aim of recovering the pneumatic energy of pressure and the inertial energy which are generated in a wheel with tyre of a vehicle, when it turns, during the use of the same vehicle.

More particularly this known apparatus for the recovery of the energy in a vehicle is composed of a plurality of devices, configured as a piston, which are placed inside the tyre of the wheel of the vehicle in order to recover the energy associated with the use of the wheel, during its rotation, wherein each of these devices comprises in turn a rod apt to move axially, in contrast with the action of a spring, because of the deformation of the tyre while the wheel turns, wherein the energy recovered by these devices, housed inside the tyre, is transmitted to a device which receives and uses the energy, recovered in this way, during the operation of the vehicle.

This apparatus, for the recovery of the energy in a vehicle, is not however free from limits and disadvantages and in particular has a very complex structure and construction, including a plurality of single-direction ball valves, associated with the piston devices housed inside the tyre, and a plurality of free wheels, associated with a complex system of gears with couplings of the pinion-rack type, in order to transmit and use the energy recovered with this apparatus.

SUMMARY OF THE INVENTION

Therefore the object of the present invention is to provide an improved wheel for vehicles which allows the recovery of at least part of the energy which is dispersed during the running of the vehicle in the form of elastic deformation of the tyres.

Another object of the invention is that of providing a generating set of electric current which uses the energy recovered by this improved wheel.

Moreover a final object of the invention is that of creating an electric propulsion vehicle which uses the abovementioned generating set of electric current.

These objects are achieved by the improved wheel for energy recovery, in particular in vehicles with electric or hybrid propulsion, having the features disclosed by the first main independent claim.

Advantageously the energy which is recovered with the improved wheel of the invention can be used to produce electrical energy which can be used in the same vehicle, for example for the recharging of the batteries which feed the electric propulsor or for the feeding of other devices of the same vehicle.

Again advantageously this energy recovery entails a reduction in the consumption for the recharging of the batteries which feed the electric propulsor of the vehicle.

Moreover, advantageously, this energy recovery can entail, in hybrid vehicles, a saving in the consumption of fuel.

Finally and advantageously this energy recovery also allows the increase in range of charge of the batteries which feed the electric propulsor and therefore a greater operating autonomy of the vehicle.

BRIEF DESCRIPTION OF THE DRAWINGS

The features, objects and advantages, as listed above, of the improved wheel of the present invention will be made clear and evident by the following description of some of its preferred embodiments, given purely by way of a non-limiting example, with reference to the accompanying drawings, in which.

DESCRIPTION OF SOME PREFERRED EMBODIMENTS OF THE IMPROVED WHEEL OF THE INVENTION

An improved wheel, for the recovery of the energy in a vehicle, object of the present invention and conforming to a respective first embodiment, is denoted overall by 1, and is shown in FIGS. 1 to 6 of the drawings.

Figure 1:
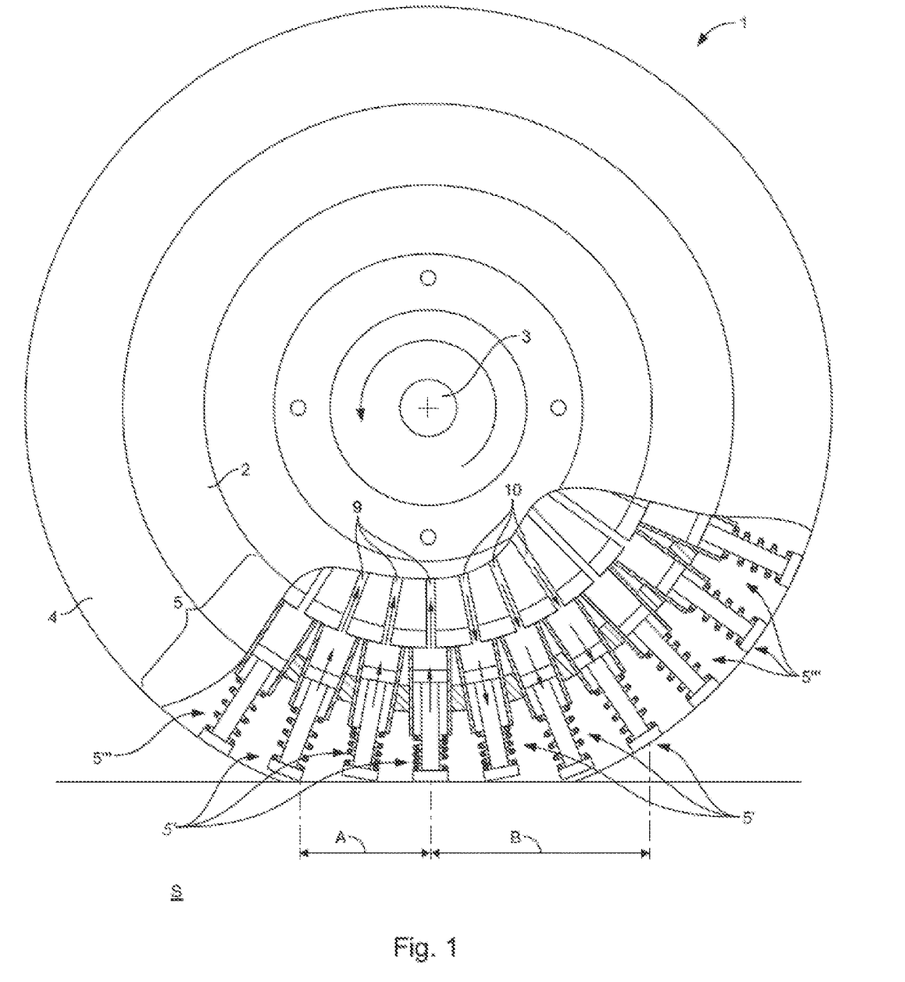
FIG. 1 shows schematically the improved wheel of the invention in a front and partially sectioned view, during operation, in a first embodiment.
Figures 2, 2A, 2B, 2C, 2D:
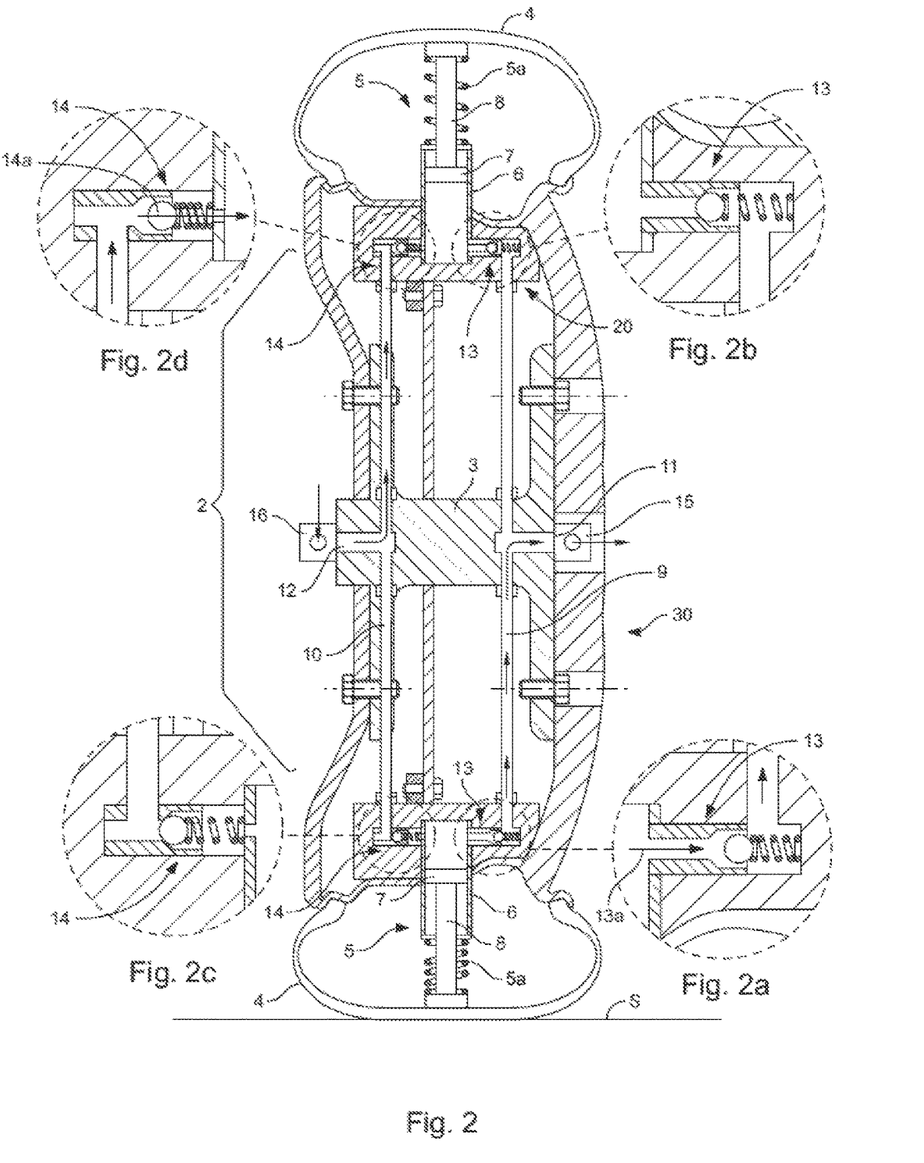
FIG. 2 shows the wheel of FIG. 1 sectioned along a diametric plane.
FIG. 2a shows an enlarged scale of a delivery flow control valve at one portion of the wheel of FIG. 2.
FIG. 2b shows an enlarged scale of a delivery flow control valve at another portion of the wheel of FIG. 2.
FIG. 2c shows an enlarged scale of a return flow control valve at one portion of the wheel of FIG. 2.
FIG. 2d shows an enlarged scale of a return flow control valve at another portion of the wheel of FIG. 2.

More particularly the wheel 1 comprises a rim 2 provided with a hub 3, which defines the rotational axis of the wheel 1, and a tyre 4 associated circumferentially with the rim 2.

According to a feature of the invention the wheel 1 comprises moreover a plurality of hydraulic actuators 5, apt to operate by means of a hydraulic fluid or oil, which are placed inside the tyre 4 and extend radially between the rim 2 and the tyre 4, wherein each of these hydraulic actuators 5 in turn comprises a cylinder 6 which is constrained to the rim 2 and in which a piston 7 is slidably housed and associated with a rod or stem 8 projecting from the cylinder 6 and constrained, at an end opposite to the one associated with the piston 7, to the tyre 4.

It is any case clear that, in a different embodiment of the invention, the cylinder 6 can be constrained to the tyre 4 while the end of the rod 8 can be constrained to the rim 2.

The hub 3 defines internally a delivery path or way 11 and a return path or way 12 which communicate with the cylinders 6 of the hydraulic actuators 5 by means of a plurality of pipes 9, 10 in which a plurality of flow control valves 13, 14 are placed, configured to allow the circulation of the hydraulic oil or fluid between the cylinders 6 and the delivery 11 and return 12 ways.

Moreover the delivery way 11 communicates with a rotating delivery manifold 15 and similarly the return way 12 communicates with a rotating return manifold 16, wherein both these rotating manifolds 15, 16, schematically shown in the drawings, are preferably, even if not necessarily, of the commercial type and therefore already available on the market.

As regards the pipes 9, 10, they comprise:
- a plurality of delivery pipes 9 each of which communicates with the delivery way 11 and is provided with a valve 13 for controlling the delivery flow of the oil from the cylinders 6 towards the delivery way 11 when the rods S of the pistons 7 move towards the interior of the cylinders 6; and
- a plurality of return pipes 10 each of which communicates with the return way 12 and is provided with a valve 14 for controlling the return flow of the oil from the return way 12 towards the cylinders 6 when the rods 8 of the pistons 7 move towards the exterior of the aforesaid cylinders 6.

In constructional terms, referring to FIG. 2, the delivery pipes 9 are placed all on the right of the drawing while the return pipes 10 are placed all on the left and develop, with reference to FIG. 1, in a radial direction with respect to the wheel itself between each cylinder 6 and the hub 3.

In detail, as shown in FIGS. 1 and 2 and as will be explained in greater detail here below, each cylinder 6 of the hydraulic actuators 5 is configured so as to communicate with a corresponding delivery pipe 9 and with a corresponding return pipe 10, and this configuration ensures the continuity of the flow of oil through the delivery way 11 and return way 12 during the rotation of the wheel 1, and therefore in the cyclical passage of the hydraulic actuators 5 from the expanded condition to the compressed condition and once again to the expanded condition.

Naturally different embodiments are also possible, not shown here for reasons of brevity, wherein a same delivery pipe and a same return pipe communicate with more than one cylinder 6.

As regards the hydraulic actuators 5, each of them is of the single-acting type with a return spring 5a of the rod 8 and of the associated piston 7, while, as regards the flow control valves 13, 14, each of them is a single-direction ball valve of the normally closed type.

As regards the flow control valves 13, 14 they, as shown in FIGS. 2a, 2b, 2c and 2d, are mounted in the respective delivery 9 and return 10 pipes in such a way that:
- each delivery flow control valve 13, shown in particular in detail in FIGS. 2a, 2b, has a direction of opening, denoted by an arrow 13a, concordant with the flow of the oil towards the respective delivery pipe 9 and therefore towards the respective delivery way 11, as can be seen in FIG. 2a;
- each return flow control valve 14, shown in particular in detail in FIGS. 2c, 2d, has a direction of opening, denoted by an arrow 14a, concordant with the flow of the oil towards the respective cylinder 6, as can be seen in FIG. 2d.

In this way, when the return springs 5a of the hydraulic actuators 5 are normally at rest, there is no movement of the rods 8 of the hydraulic actuators 5 and therefore the delivery 13 and return 14 flow control valves are normally closed and consequently there is no flow of oil through the respective delivery 11 and return 12 ways.

When instead the hydraulic oil is compressed in the cylinders 6, the delivery flow control valves 13 open, as shown in FIG. 2a, to allow the flow of the oil via the delivery way 11, while the return flow control valves 14 are kept closed, as shown in FIG. 2c, by the same pressure of the oil which is present inside the cylinder 6 and therefore acts on them.

Finally, when the oil is aspirated in the cylinders 6, the delivery flow control valves 13 are kept closed by the vacuum generated by the return of the piston 7 in the cylinder 6, as shown in FIG. 2b, while the return flow control valves 14 are kept open by the same vacuum and allow the flow of the oil coming from the return way 12, as shown in FIG. 2d.

As regards the rim 2 whereof the wheel 1 is composed, it comprises:
- an internal structure 20 which supports the hydraulic actuators 5, the pipes 9, 10 and the hub 3, and
- an external structure 30 which is removably attachable to the internal structure 20 via appropriate attachment means 33 and is configured in such as way as to define a shaped seat 34 apt to receive said tyre 4.

Figure 3:
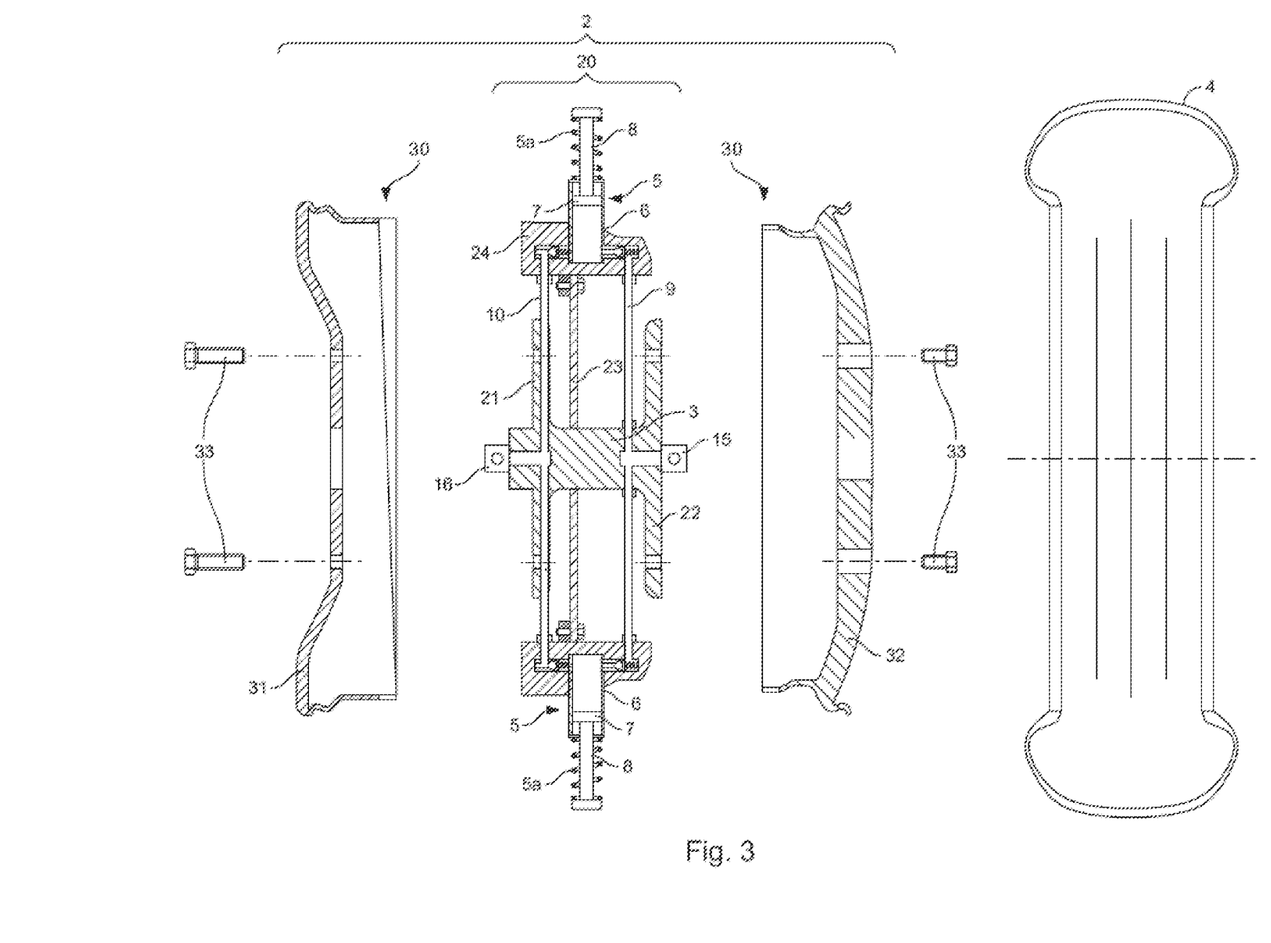
FIG. 3 shows the wheel of FIG. 2 in a blown-up view.
Figure 4:
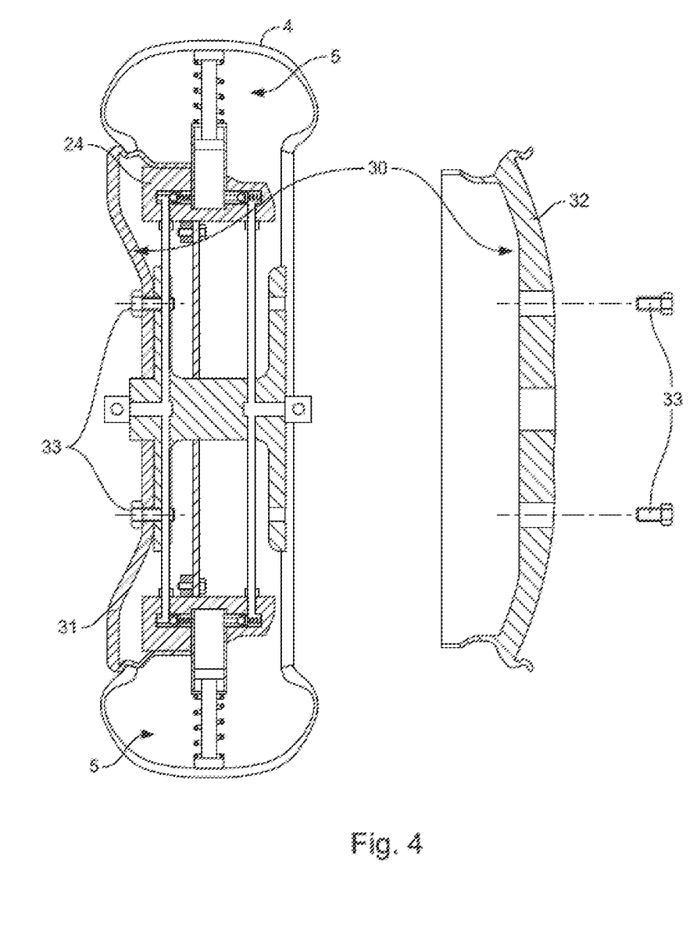
FIG. 4 shows the wheel of FIG. 3 partially assembled.
Figure 5:
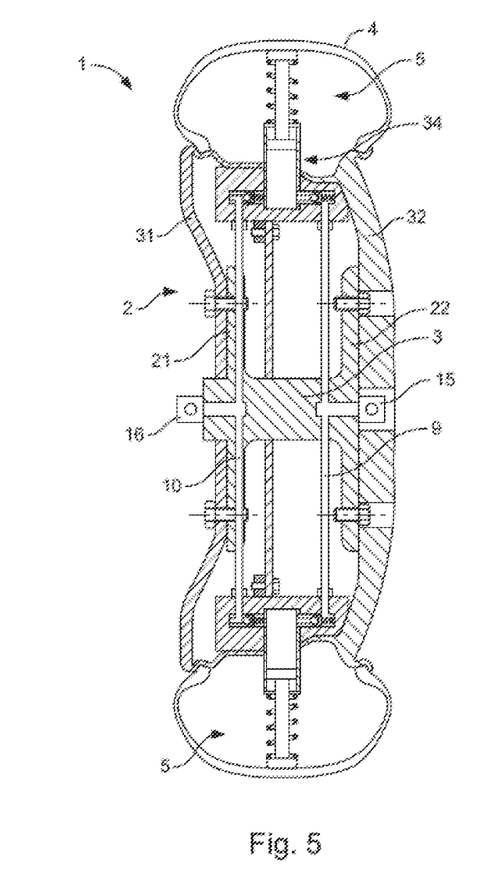
FIG. 5 shows the wheel of FIG. 4 fully assembled and in rest position.

More particularly the internal structure 20, as can be seen in particular in FIGS. 3 and 4, comprises a pair of counter-flanges 21, 22, reciprocally distanced along the axis of the wheel 1, which extend radially and are an integral part of the hub 3 of the wheel 1, and a central support 23, associated with the hub 3, which is placed between the two counter-flanges 21, 22.

Moreover the rim 2 has an annular body 24, coaxial to the hub 3, in which this annular body 24 is associated with the outer profile of the central support 23 and supports the hydraulic actuators 5 and the respective cylinders 6.

Finally the delivery 9 and return 10 pipes are placed and configured in such a way that, as already mentioned previously, each of them connects a corresponding and specific cylinder 6 of a hydraulic actuator 5 respectively to the delivery way 11 and to the return way 12, common to all the pipes 9 and 10.

As regards the external structure 30 of the rim 2, it is noted instead that it comprises a pair of shaped flanges 31, 32, each of which is configured to be removably connected adjacent to the corresponding counter-flange 21, 22 by means of removable attachment means 33 which preferably but not necessarily are made up of screws.

As anticipated, the wheel 1 of the invention can be advantageously attached and mounted on a usual vehicle, in order to recover at least part of the energy which is required and consumed in order to deform the tyre 4 of the wheel 1 while it turns, during the movement of the vehicle.

In operational terms, referring to FIGS. 1 and 2, when the vehicle moves and therefore the respective wheel 1 turns, the pistons 7 of the hydraulic actuators 5 housed inside the tyre 4 of the wheel 1 move cyclically, forwards and backwards or towards and from the interior of the respective cylinders 6, at each turn of the wheel 1.

More specifically, when the zone of the tyre 4 in which a generic hydraulic actuator 5 is placed comes into contact, and consequently deforms, with the road surface on which the vehicle is moving, and consequently the piston 7 of the hydraulic actuator 5 moves towards the interior of the cylinder 6 because of this deformation, the hydraulic oil which fills the same cylinder 6 is pressurised and flows from the cylinder 6 towards the delivery way 11.

Instead, when the same piston 7 of the hydraulic actuator 5 moves towards the exterior of the cylinder 6 because of the relaxation and return into the non-deformed configuration of the zone of the tyre 4 in which the hydraulic actuator 5 is placed, once this zone is no longer in contact with the road surface, the hydraulic oil flows from the return way 12 towards the cylinder 6.

In other words, referring to FIG. 1, when the wheel 1 turns for example in the anticlockwise direction as denoted by an arrow in the same FIG. 1, the hydraulic actuators 5' which are placed at the zone A of the tyre 4 which comes into contact with the ground S are compressed due to the deformation which the tyre 4 undergoes because of the weight of the vehicle to which the wheel 1 is attached.

Therefore in this situation the pistons 7 of the hydraulic actuators 5' return into the respective cylinders 6, pressurise the oil and pump it towards the delivery way 11.

Simultaneously the hydraulic actuators 5" which are placed in the zone B which, during the rotation of the wheel 1, comes out of contact with the ground S, are subject to expand because of the return of the tyre 4 into the non-deformed configuration under the action of the elastic recovery of the return spring 5a and which draw back the pistons 7 towards the exterior of the respective cylinders 6.

Therefore in this situation the pistons 7, of the hydraulic actuators 5", exit and expand from the respective cylinders 6, so as to reduce the pressure in the oil, which consequently is aspirated by the return way 12 and flows towards the interior of the cylinders 6.

The action of aspiration of the oil continues until the zone B is no longer in contact with the ground S, i.e. until the return springs 5a of the hydraulic actuators 5", having exhausted their elastic thrust, return into the condition of rest and end the action of drawing back of the pistons 7.

Consequently also no circulation of oil occurs through the delivery 11 and return 12 ways by the cylinders 6 of the actuators 5" which are placed, during the rotation of the wheel 1, outside of zones A and B, when the return springs 5a of the respective pistons 7 are normally at rest.

It is also clear that during the rotation of the wheel 1, inside each of the hydraulic actuators 5 housed inside the tyre 4 of the wheel 1, a cyclical and continuous sequence occurs of states of compression and of aspiration which generates a continuous flow of oil which exits from the delivery way 11 and which returns via the return way 12.

Figure 6:
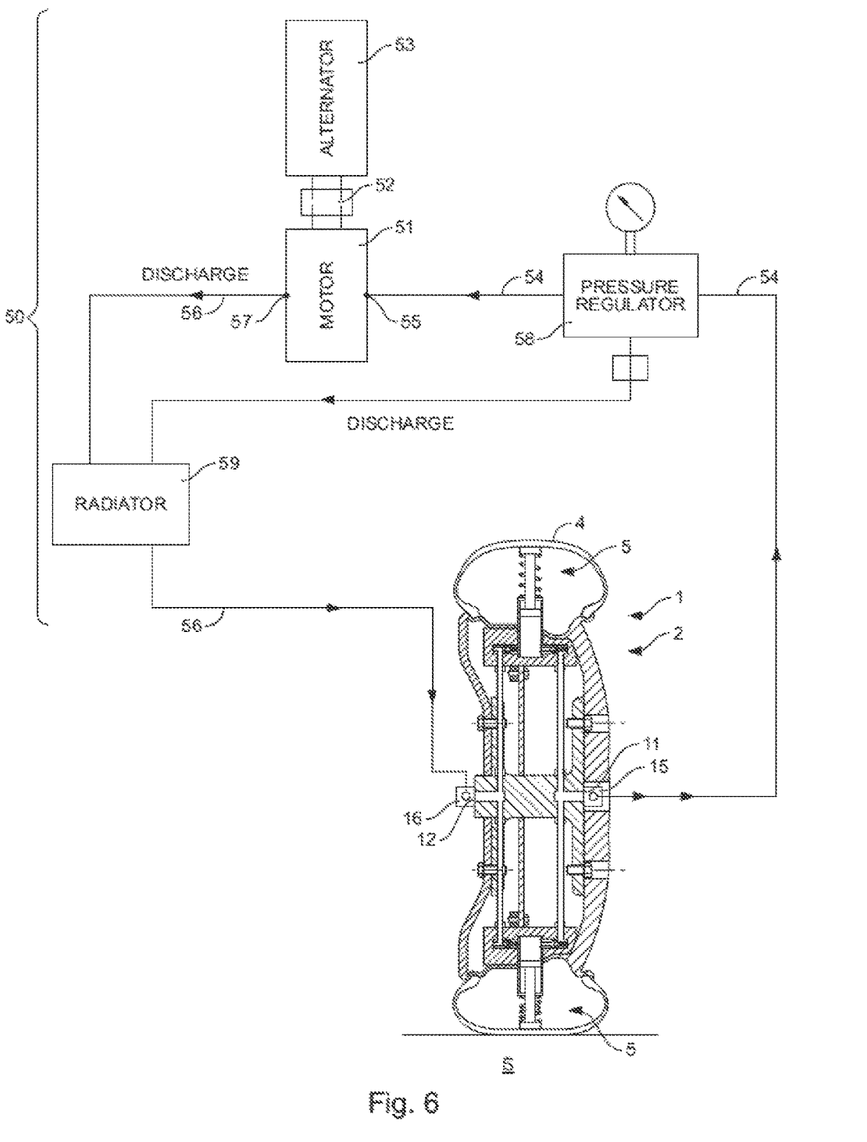
FIG. 6 shows a generating set of electric current which uses the wheel of the invention.

The continuous return and delivery flow of hydraulic oil can be advantageously used in a generating set of electric current, shown in FIG. 6 where it is denoted overall by 50, which can be applied to an electric drive or hybrid drive vehicle, not shown, provided with one or more wheels 1 in accordance with the present invention, wherein this generating set comprises for example a hydraulic motor 51 having a drive shaft 52 coupled to a generator of electrical energy 53, for example consisting of an alternator.

In this application the delivery way 11 of each wheel 1 is connected to a feed way 55 of the hydraulic motor 51 via a delivery conduit 54 and the return way 12 of each wheel 1 is in turn connected to a discharge way 57 of the hydraulic motor 51 via a return conduit 56.

Moreover, preferably but not necessarily, the generating set 50 comprises also a pressure regulator 58 and a radiator 59 for cooling the hydraulic oil.

In this way, during the rotation of the wheels 1, a continuous circulation of pressurised oil is generated, via the hydraulic motor 51, which therefore is made to rotate and in turn drives the rotation of the generator 53, so as to generate electrical energy.

The electrical energy produced by the generator 53 can in turn be used in various ways, for example in order to recharge continuously the feed batteries of the electric propulsor or for feeding other devices of the vehicle.

An improved wheel, for the recovery of energy in a vehicle, the object of the present invention and in accordance with a second embodiment denoted overall by 101, with respect to the first embodiment 1, described previously, is shown in FIGS. 7 to 11 of the drawings.

For the sake of clarity the parts of the wheel 101, in accordance with this second embodiment, will be denoted where possible with reference numerals incremented by 100 with respect to those adopted to denote the corresponding parts included in the first embodiment 1.

This second embodiment 101 of the improved wheel of the invention is substantially similar, structurally and operationally, to the first embodiment 1, and therefore the description of this second embodiment 101 of the wheel of the invention has fundamentally the purpose of integrating the description of the first embodiment 1, specifying better some essential parts and the relative features of the improved wheel of the invention for the recovery of energy in a vehicle.

First of all it is reiterated that the wheel 101 was developed to be suitable for being mounted and attached on the usual vehicles circulating on the road with electric propulsors and the like and in fact, to this end, is configured so as to be able to mount a normal tyre already available commercially.

In detail, as shown in FIGS. 7-10, the development and the modifications of the wheel 101 with respect to the wheel 1 related essentially to the rim 102, the respective external flanges 131, 132, the rotating valve 115 and the hub 103 of the same wheel 101.

Figure 9:
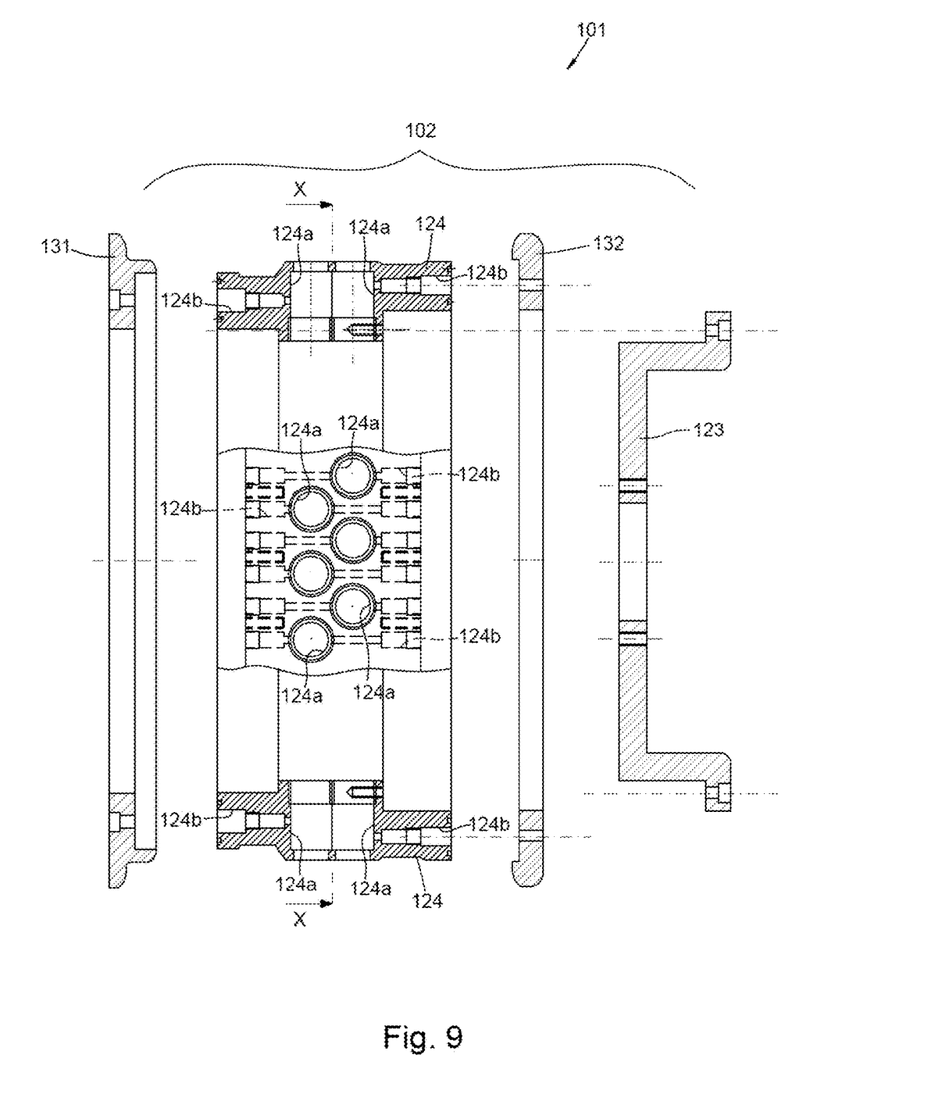
FIG. 9 shows in blown-up form the parts which make up the rim of the wheel of FIGS. 7 and 8.
Figure 10:
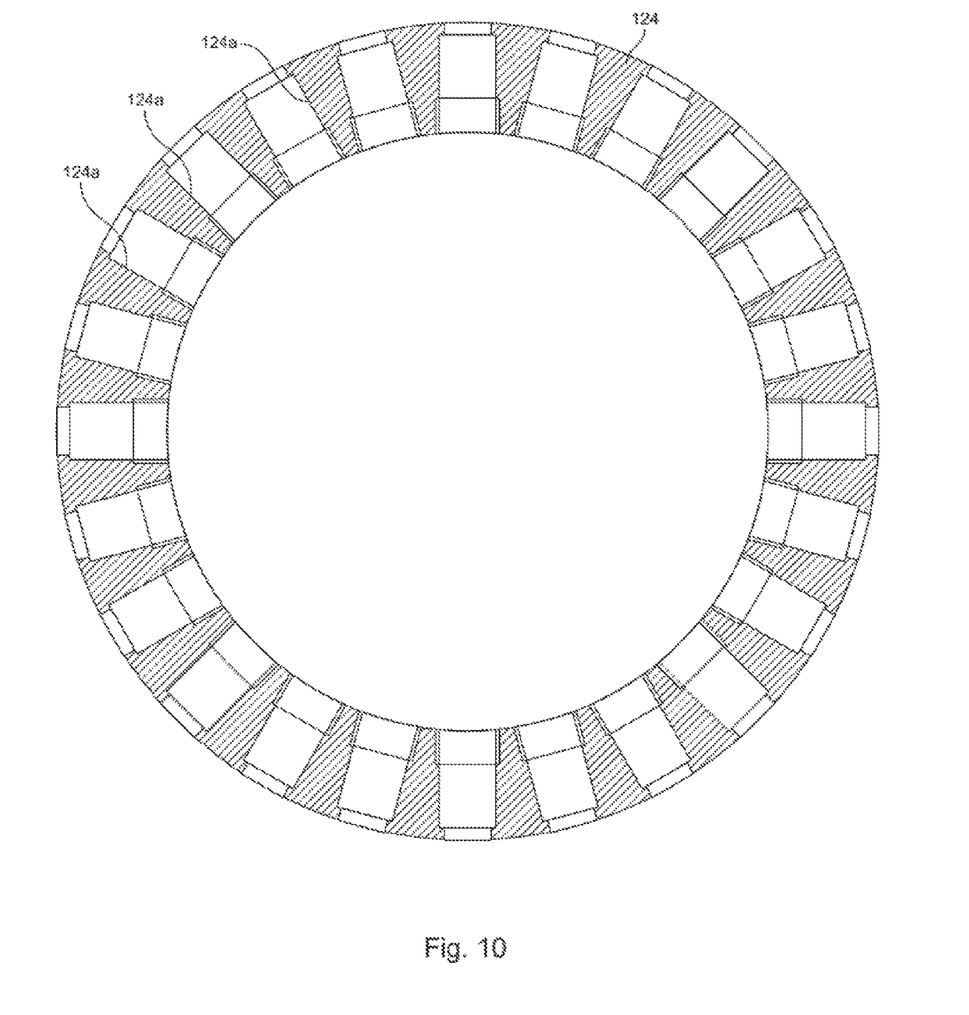
FIG. 10 shows sectioned, along the plane defined by line X-X of FIG. 9, an annular body which is part of the rim of the improved wheel of the invention of FIGS. 7 and 8.

More in detail, the rim 102, included in the wheel 101, comprises an annular body 124, corresponding to the annular body 24 of the wheel 1 and shown in section in FIGS. 9 and 10, which has a plurality of holes, denoted by 124a, suitable for housing the hydraulic actuators 105 and a plurality of seats 124b suitable for housing the respective delivery and return valves 113, 114.

Figure 7:
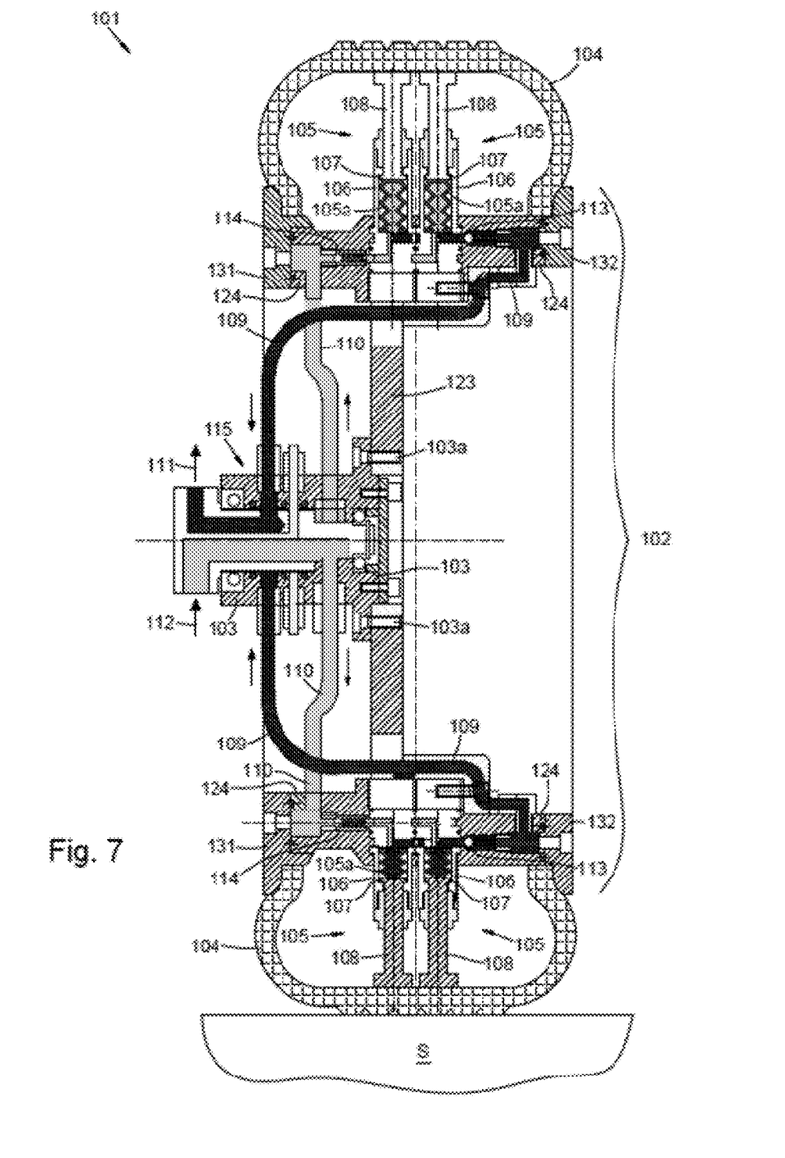
FIG. 7 shows the improved wheel of the invention, sectioned along a diametric plane, in accordance with a second embodiment more detailed than the first.
Figure 8:
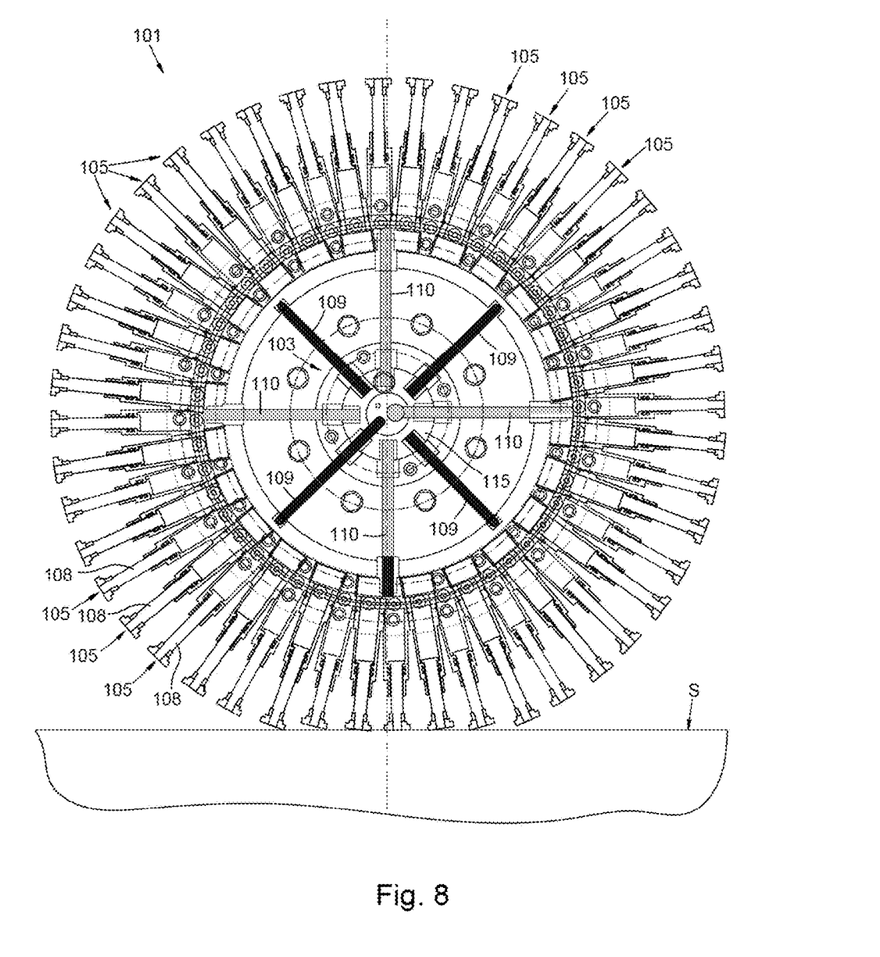
FIG. 8 shows in a frontal view with some parts removed the improved wheel of the invention of FIG. 7, in accordance with the second embodiment of the invention

Moreover the wheel 101 comprises a system of pipes and channels, appropriately shaped, which extend in the rim 102 and which have the function of conveying towards the rotating valve 115 the oil which is pressed by the hydraulic actuators 105 and of conveying from the rotating valve 115 to the hydraulic actuators 105 the oil which is aspirated by the same hydraulic actuators 115.

In the wheel 101 the external flanges 131 and 132 are attached stably to the rim 102, for example by means of bolts, and have the dual function of constraining the tyre 104 laterally, along the edges, and of closing and sealing hermetically the system of channels and pipes 109 and 109 which place in communication each hydraulic actuator 105 with the common delivery way 111 and the common return way 112 and therefore convey the hydraulic oil from the hydraulic actuators 105 towards the delivery way 111 and from the return way 112 towards the hydraulic actuators 105.

Similarly to the wheel 1, also in the wheel 101 a rotating valve 115 allows transfer of the oil or the hydraulic liquid from the wheel 101, while it turns, to the hydraulic motor attached directly on the frame of the vehicle on which the wheel 101 is attached.

The hub 103 is attached to a central part of the rim 102 by means of a series of bolts 103a and both the rotating valve 115 and a flange with holes are attached thereon, so as to be able to attach the hub 103 on a usual hub of the wheel of any vehicle available commercially.

The operation of the wheel 101 in order to recover the energy which is consumed, during the rotation of the same wheel 101, in order to deform the respective tyre 104, for example to use the energy recovered in this way with the wheel 101 in order to produce electrical energy, is similar to that of the wheel 1, and therefore will not be described in detail.

It is only reiterated that the wheel 101, rotating in contact with the ground, is subject, due to the weight of the vehicle on which the wheel 101 is mounted, to deform cyclically, at each turn of the wheel 101, in the zone of the tyre 104 which comes into contact with the ground S.

Therefore these cyclical deformations of the various zones of the tyre 104 which, at each turn of the wheel 101, come into contact with the ground S, drive the hydraulic actuators 105, housed inside the tyre 104, so as to compress and pump and subsequently draw back, via the intervention of the single-direction valves 113 and 114, the liquid or the hydraulic oil contained in the hydraulic actuators 105.

In this way the wheel 101, turning in contact with the ground during the movement of the vehicle on which the same wheel 101 is mounted, creates a continuous flow of hydraulic oil which is conveyed by means of an appropriately shaped system of channels and pipes to the rotating valve 115, which in turn conveys it towards the hydraulic motor installed on board the vehicle.

Figure 11:
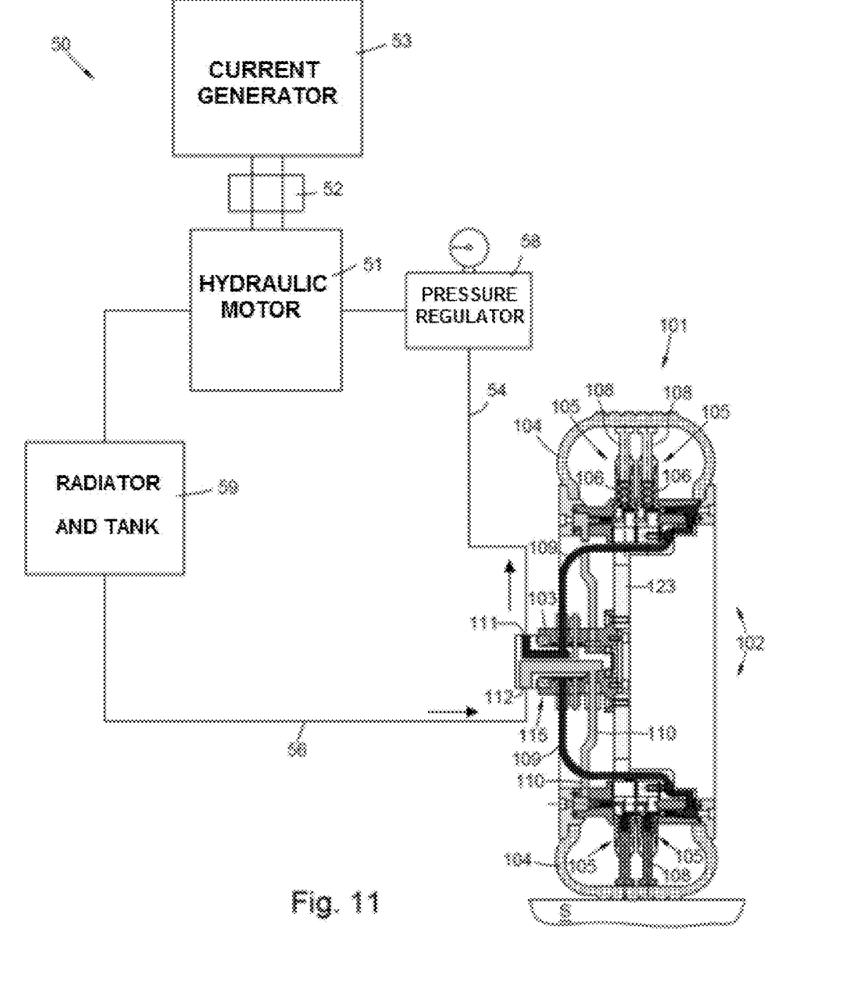
FIG. 11 is a diagram which shows a generating set of electric current which uses the wheel of the invention of FIGS. 7 and 8.

The hydraulic motor in turn is coupled to a generator of current appropriately dimensioned proportionally, having the function of producing the electric current which serves to make the vehicle operate.

Therefore, in brief, it can be said that the wheel of the invention operates like a hydraulic pump actuated by the simple rolling of the same wheel.

It is therefore clear, on the basis of what has been described hitherto, that the wheel of the invention achieves in full all the aims set.

More particularly the application of the wheel of the invention to a vehicle with electric propulsor allows recovery of part of the energy of deformation of the tyres which would otherwise be lost and to transform it into electrical energy which can be used in the same vehicle.

Naturally changes, variations and improvements may be made to the wheel of the invention, for example in the phase of production, which, even if not described here and not shown in the drawings, are to be considered within the same invention and therefore protected by the present patent.

The invention claimed is:

1. A wheel for vehicles including a rim provided with a hub which defines the rotational axis of the wheel and a tire, associated circumferentially with said rim, configured to come into contact with the ground during the rotation of the wheel, the wheel comprising:
   a plurality of hydraulic actuators oriented in a radial direction and placed in said tire, between the tire and said rim, each of said hydraulic actuators comprising a cylinder, constrained to one of said rim and said tire, a piston being slidably housed in the cylinder and associated with a rod projecting from said cylinder and constrained to the other of said tire and said rim;
   at least one delivery system and at least one return system formed in the hub of the wheel;
   a plurality of delivery pipes configured to connect and place in communication each cylinder of said hydraulic actuators with said delivery system;
   a plurality of return pipes configured to connect and place in communication each cylinder of said hydraulic actuators with said return system;
   a first plurality of flow control valves placed in said delivery pipes and configured to allow a single-direction circulation of a hydraulic oil from the cylinder of each hydraulic actuator towards said delivery system, when the piston of the hydraulic actuator moves towards the interior of the cylinder, due to deformation of zones of the tire which come into contact, at each turn of the wheel, with the ground during movement of the vehicle on which the wheel is mounted;
   a second plurality of flow control valves placed in said return pipes and configured to allow a single-direction circulation of hydraulic oil from said return system towards the cylinder of each hydraulic actuator, when the piston of the hydraulic actuator moves towards an exterior of the cylinder, due to the return into a non-deformed configuration of the zones of the tire at each turn of the wheel at the end of the contact with the ground during the movement of the vehicle; and
   at least one rotating valve associated with the hub of the wheel and comprising a rotating delivery manifold and a rotating return manifold, said rotating valve being configured to connect and place in communication, via the respective rotating delivery manifold, said delivery pipes with said delivery system and, via the respective rotating return manifold, said return pipes with said return system,
   wherein said wheel is configured to recover, in the form of pressure energy of the hydraulic oil which flows in said pipes, at least a part of the energy which is consumed in order to deform the tire, during the rotation of the wheel, and to transfer, via the delivery system and the return system associated with the hub of the wheel, the recovered energy from the wheel to the vehicle on which the wheel is mounted, so that the recovered energy is used in the vehicle and is converted into electrical energy intended to feed the devices installed on the vehicle.

2. The wheel for vehicles according to claim 1, wherein each of said flow control valves is a normally closed single-direction ball valve.

3. The wheel for vehicles according to claim 2, wherein each of said hydraulic actuators is of the single-acting type with return spring.

4. The wheel for vehicles according to claim 2, wherein said rim comprises:
an internal structure that supports said hydraulic actuators, placed in said tire, said pipes and said hub, and
an external structure removably attachable to said internal structure via an attachment system and configured to defined a shaped seat configured to receive said tire.

5. A system for the recovery in a vehicle, with electric propulsion, of the energy associated with the deformation of the tires of the wheels of the vehicle while the wheels turn, the system comprising:
one or more wheels according to claim 2, configured to be mounted on the vehicle; and
a generating set of electric current, installable on board the vehicle on which said one or more wheels are mounted, comprising a hydraulic motor coupled to a generator of electrical energy,
wherein said hydraulic motor, included in the generating set of electrical current, is configured to be fed with hydraulic oil which comes from said one or more wheels mounted on the vehicle, by the delivery system associated with the hub of said one or more wheels, and to discharge the hydraulic oil towards said one or more wheels mounted on the vehicle, via the return system associated with the hub of said one or more wheels, to convert by said generator of electrical energy coupled with the hydraulic motor, the pressure energy transferred by the hydraulic oil from said one or more wheels to said generating set of electric current into electrical energy configured to feed an electric propulsor of the vehicle.

6. A vehicle, with electric propulsion, with capacity to at least partially recover the energy consumed and necessary to deform the wheels of the vehicle while the wheels turn during the running of the vehicle, the vehicle comprising:
one or more wheels according to claim 2;
an electric propulsor configured to drive the rotation of said wheels and therefore to move the vehicle on which said one or more wheels are mounted; and
a generating set of electric current, installable on board the vehicle, having a hydraulic motor coupled with a generator of electrical energy,
wherein said hydraulic motor is configured to be fed with hydraulic oil which comes from said one or more wheels mounted on the vehicle, via the delivery system associated with the hub of said one or more wheels, and to return and discharge the hydraulic oil towards said one or more wheels mounted on the vehicle, via the return system associated with the hub of said one or more wheels, to convert, by said generator of electrical energy coupled with the hydraulic motor, the pressure energy transferred by the hydraulic oil from said one or more wheels to said generating set of electric current into electrical energy intended to feed devices installed on the vehicle including said electric propulsor.

7. The wheel for vehicles according to claim 1, wherein each of said hydraulic actuators is of the single-acting type with return spring.

8. The wheel for vehicles according to claim 7, wherein said rim comprises:
an internal structure that supports said hydraulic actuators, placed in said tire, said pipes and said hub, and
an external structure removably attachable to said internal structure via an attachment system and configured to defined a shaped seat configured to receive said tire.

9. A system for the recovery in a vehicle, with electric propulsion, of the energy associated with the deformation of the tires of the wheels of the vehicle while the wheels turn, the system comprising:
one or more wheels according to claim 7, configured to be mounted on the vehicle; and
a generating set of electric current, installable on board the vehicle on which said one or more wheels are mounted, comprising a hydraulic motor coupled to a generator of electrical energy,
wherein said hydraulic motor, included in the generating set of electrical current, is configured to be fed with hydraulic oil which comes from said one or more wheels mounted on the vehicle, by the delivery system associated with the hub of said one or more wheels, and to discharge the hydraulic oil towards said one or more wheels mounted on the vehicle, via the return system associated with the hub of said one or more wheels, to convert by said generator of electrical energy coupled with the hydraulic motor, the pressure energy transferred by the hydraulic oil from said one or more wheels to said generating set of electric current into electrical energy configured to feed an electric propulsor of the vehicle.

10. A vehicle, with electric propulsion, with capacity to at least partially recover the energy consumed and necessary to deform the wheels of the vehicle while the wheels turn during the running of the vehicle, the vehicle comprising:
one or more wheels according to claim 7;
an electric propulsor configured to drive the rotation of said wheels and therefore to move the vehicle on which said one or more wheels are mounted; and
a generating set of electric current, installable on board the vehicle, having a hydraulic motor coupled with a generator of electrical energy,
wherein said hydraulic motor is configured to be fed with hydraulic oil which comes from said one or more wheels mounted on the vehicle, via the delivery system associated with the hub of said one or more wheels, and to return and discharge the hydraulic oil towards said one or more wheels mounted on the vehicle, via the return system associated with the hub of said one or more wheels, to convert, by said generator of electrical energy coupled with the hydraulic motor, the pressure energy transferred by the hydraulic oil from said one or more wheels to said generating set of electric current into electrical energy intended to feed devices installed on the vehicle including said electric propulsor.

11. The wheel for vehicles according to claim 1, wherein said rim comprises:
an internal structure that supports said hydraulic actuators, placed in said tire, said pipes and said hub, and
an external structure removably attachable to said internal structure via an attachment system and configured to define a shaped seat configured to receive said tire.

12. A system for the recovery in a vehicle, with electric propulsion, of the energy associated with the deformation of the tires of the wheels of the vehicle while the wheels turn, the system comprising:
one or more wheels according to claim 11, configured to be mounted on the vehicle; and a generating set of electric current, installable on board the vehicle on which said one or more wheels are mounted, comprising a hydraulic motor coupled to a generator of electrical energy, wherein said hydraulic motor, included in the generating set of electrical current, is configured to be fed with hydraulic oil which comes from said one or more wheels mounted on the vehicle, by the delivery system associated with the hub of said one or more wheels, and to discharge the hydraulic oil towards said one or more wheels mounted on the vehicle, via the return system associated with the hub of said one or more wheels, to convert by said generator of electrical energy coupled with the hydraulic motor, the pressure energy transferred by the hydraulic oil from said one or more wheels to said generating set of electric current into electrical energy configured to feed an electric propulsor of the vehicle.

13. A vehicle, with electric propulsion, with capacity to at least partially recover the energy consumed and necessary to deform the wheels of the vehicle while the wheels turn during the running of the vehicle, the vehicle comprising:

one or more wheels according to claim 11;
an electric propulsor configured to drive the rotation of said wheels and therefore to move the vehicle on which said one or more wheels are mounted; and
a generating set of electric current, installable on board the vehicle, having a hydraulic motor coupled with a generator of electrical energy,
wherein said hydraulic motor is configured to be fed with hydraulic oil which comes from said one or more wheels mounted on the vehicle, via the delivery system associated with the hub of said one or more wheels, and to return and discharge the hydraulic oil towards said one or more wheels mounted on the vehicle, via the return system associated with the hub of said one or more wheels, to convert, by said generator of electrical energy coupled with the hydraulic motor, the pressure energy transferred by the hydraulic oil from said one or more wheels to said generating set of electric current into electrical energy intended to feed devices installed on the vehicle including said electric propulsor.

14. The wheel for vehicles according to claim 11, wherein said internal structure comprises:

a pair of counter-flanges associated radially with said hub and distanced axially one from the other along the axis of the wheel,
a central support associated with said hub and placed between said counter-flanges, and
an annular body external and coaxial to said hub,
wherein said annular body is associated with the outer profile of said central support and supports the cylinders of said hydraulic actuators.

15. A system for the recovery in a vehicle, with electric propulsion, of the energy associated with the deformation of the tires of the wheels of the vehicle while the wheels turn, the system comprising:

one or more wheels according to claim 14, configured to be mounted on the vehicle; and
a generating set of electric current, installable on board the vehicle on which said one or more wheels are mounted, comprising a hydraulic motor coupled to a generator of electrical energy,
wherein said hydraulic motor, included in the generating set of electrical current, is configured to be fed with hydraulic oil which comes from said one or more wheels mounted on the vehicle, by the delivery system associated with the hub of said one or more wheels, and to discharge the hydraulic oil towards said one or more wheels mounted on the vehicle, via the return system associated with the hub of said one or more wheels, to convert by said generator of electrical energy coupled with the hydraulic motor, the pressure energy transferred by the hydraulic oil from said one or more wheels to said generating set of electric current into electrical energy configured to feed an electric propulsor of the vehicle.

16. A vehicle, with electric propulsion, with capacity to at least partially recover the energy consumed and necessary to deform the wheels of the vehicle while the wheels turn during the running of the vehicle, the vehicle comprising:

one or more wheels according to claim 14;
an electric propulsor configured to drive the rotation of said wheels and therefore to move the vehicle on which said one or more wheels are mounted; and
a generating set of electric current, installable on board the vehicle, having a hydraulic motor coupled with a generator of electrical energy,
wherein said hydraulic motor is configured to be fed with hydraulic oil which comes from said one or more wheels mounted on the vehicle, via the delivery system associated with the hub of said one or more wheels, and to return and discharge the hydraulic oil towards said one or more wheels mounted on the vehicle, via the return system associated with the hub of said one or more wheels, to convert, by said generator of electrical energy coupled with the hydraulic motor, the pressure energy transferred by the hydraulic oil from said one or more wheels to said generating set of electric current into electrical energy intended to feed devices installed on the vehicle including said electric propulsor.

17. The wheel according to claim 14, wherein said external structure comprises a pair of shaped flanges, each one of the shaped flanges being configured to be removably connected adjacent to a corresponding one of said counter-flanges by said attachment system.

18. A system for the recovery in a vehicle, with electric propulsion, of the energy associated with the deformation of the tires of the wheels of the vehicle while the wheels turn, the system comprising:

one or more wheels according to claim 17, configured to be mounted on the vehicle; and
a generating set of electric current, installable on board the vehicle on which said one or more wheels are mounted, comprising a hydraulic motor coupled to a generator of electrical energy,
wherein said hydraulic motor, included in the generating set of electrical current, is configured to be fed with hydraulic oil which comes from said one or more wheels mounted on the vehicle, by the delivery system associated with the hub of said one or more wheels, and to discharge the hydraulic oil towards said one or more wheels mounted on the vehicle, via the return system associated with the hub of said one or more wheels, to convert by said generator of electrical energy coupled with the hydraulic motor, the pressure energy transferred by the hydraulic oil from said one or more wheels to said generating set of electric current into electrical energy configured to feed an electric propulsor of the vehicle.

19. A system for the recovery in a vehicle, with electric propulsion, of the energy associated with the deformation of the tires of the wheels of the vehicle while the wheels turn, the system comprising:

one or more wheels according to claim 1, configured to be mounted on the vehicle; and
a generating set of electric current, installable on board the vehicle on which said one or more wheels are mounted, comprising a hydraulic motor coupled to a generator of electrical energy,
wherein said hydraulic motor, included in the generating set of electrical current, is configured to be fed with hydraulic oil which comes from said one or more wheels mounted on the vehicle, by the delivery system associated with the hub of said one or more wheels, and to discharge the hydraulic oil towards said one or more wheels mounted on the vehicle, via the return system associated with the hub of said one or more wheels, to convert by said generator of electrical energy coupled with the hydraulic motor, the pressure energy transferred by the hydraulic oil from said one or more wheels to said generating set of electric current into electrical energy configured to feed an electric propulsor of the vehicle.

20. A vehicle, with electric propulsion, with capacity to at least partially recover the energy consumed and necessary to deform the wheels of the vehicle while the wheels turn during the running of the vehicle, the vehicle comprising:
one or more wheels according to claim 1;
an electric propulsor configured to drive the rotation of said wheels and therefore to move the vehicle on which said one or more wheels are mounted; and
a generating set of electric current, installable on board the vehicle, having a hydraulic motor coupled with a generator of electrical energy,
wherein said hydraulic motor is configured to be fed with hydraulic oil which comes from said one or more wheels mounted on the vehicle, via the delivery system associated with the hub of said one or more wheels, and to return and discharge the hydraulic oil towards said one or more wheels mounted on the vehicle, via the return system associated with the hub of said one or more wheels, to convert, by said generator of electrical energy coupled with the hydraulic motor, the pressure energy transferred by the hydraulic oil from said one or more wheels to said generating set of electric current into electrical energy intended to feed devices installed on the vehicle including said electric propulsor.

* * * * *